Oct. 1, 1968  AKIRA SHIIKI  3,403,692

REGULATOR

Filed June 30, 1965  2 Sheets-Sheet 1

INVENTOR.
AKIRA SHIIKI
BY
ATTORNEY

Oct. 1, 1968  AKIRA SHIIKI  3,403,692
REGULATOR
Filed June 30, 1965  2 Sheets-Sheet 2

INVENTOR.
AKIRA SHIIKI
BY
ATTORNEY 3,403,692
REGULATOR
Akira Shiiki, Tokyo, Japan, assignor to Honeywell Inc., Minneapolis, Minn., a corporation of Delaware
Filed June 30, 1965, Ser. No. 468,204
Claims priority, application Japan, June 30, 1964, 39/37,186
4 Claims. (Cl. 137—81.5)

ABSTRACT OF THE DISCLOSURE

A regulator for retaining a flow or flow pressure at a predetermined value having an inlet and outlet and a pair of main channels therebetween. A restriction is located within one of the main channels, and the outlet is provided with supply inlets which communicate with pressure chambers on opposite sides of a diaphragm. The diaphragm responds to pressure changes in the outlet for closing one of two gates and removing atmospheric pressure from one of two inlet portions on opposite sides of the two main channels. Through this arrangement the flow or flow pressure is directed into either the restricted or unrestricted main channel for decreasing or inceasing the flow or flow pressure to provide regulation thereof at a predetermined value.

---

The present invention relates to a regulator which automatically controls the flow or flow pressure in a fluid supply channel at a predetermined value. In accordance with the prior art regulator, there is provided a valve or cock used for controlling fluid flow by holding the degree of an opening thereof constant, but the predetermined value of flow or flow pressure thus established is often apt to be influenced by such variation in the external circumstances as variation of flow pressure at a fluid supply inlet or at a fluid exhaust outlet. Therefore, it is difficult in the prior art regulator to maintain the flow pressure at a constant predetermined value.

An object of the present invention is to avoid the said difficulty of the prior art regulator and to provide a regulator to control the fluid stream so as to maintain automatically the fluid flow or fluid pressure at a predetermined value.

Figure 1:
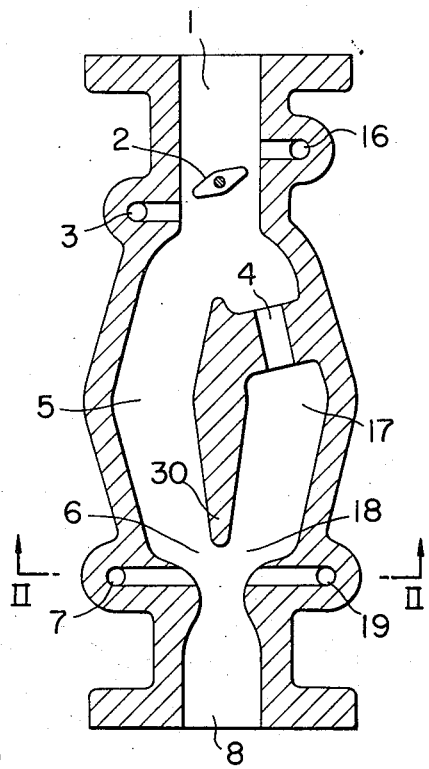
Figure 2:
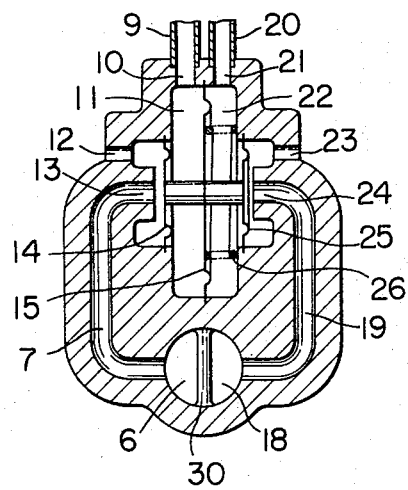
Figure 3:
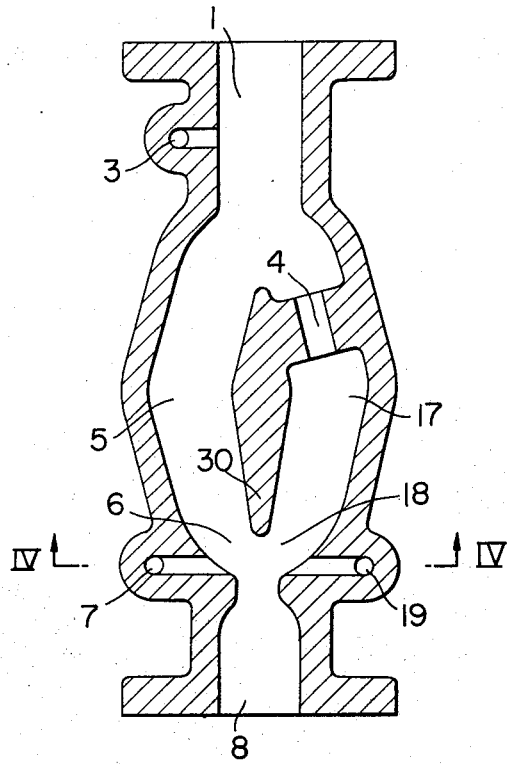
Figure 4:
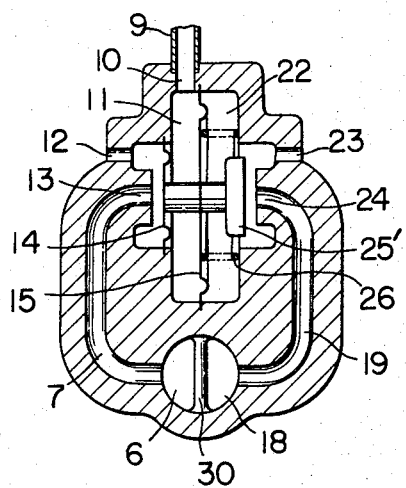

Other objects and many of the attendant advantages of the present invention will be further illustrated in conjunction with the attached drawings as follows:

FIG. 1 is a sectional front view of an embodiment of a regulator provided in accordance with the present invention, available to regulate the flow of a fluid, FIG. 2 is a sectional plan view of the regulator shown in FIG. 1 along a line II—II, FIG. 3 is a longitudinal sectioned front view of a regulator shown in FIG. 1 used to regulate the secondary pressure of the fluid, and FIG. 4 is a sectional plan view of the regulator shown in FIG. 3 along a line IV—IV.

The apparatus shown in FIG. 1 and FIG. 2 is a regulator provided in accordance with the present invention to maintain the flow of a fluid, such as air, at a predetermined value $Q_0$, as it passes through a supply channel. A butterfly type valve 2 is arranged within the supply channel for controlling the opening area of said supply channel and forming an orifice having a flow coefficient $C_0$. The front pressure and the rear pressure across said butterfly type valve is $P_1$ and $P_2$, respectively. The pressure difference $\Delta P_0$ between the front pressure $P_1$ and the rear pressure $P_2$ can be expressed as follows:

$$\Delta P_0 = P_1 - P_2$$

$$Q_0 \alpha C_0 \sqrt{\Delta P_0} = C_0 \sqrt{P_1 - P_2}$$

The fluid having the pressure $P_1$ is supplied from a supply inlet 3, on the downstream side of the butterfly type valve 2, through a connection tube 9 and an exhaust outlet 10 to a high pressure chamber 11. The fluid having the pressure $P_2$ is supplied from a supply inlet 16, on the up stream side of valve 2, through a connection tube 20 and an exhaust outlet 21 to a low pressure chamber 22. The fluid pressures $P_1$ and $P_2$ are respectively supplied to the left side and the right side of a diaphragm 15 located between high and low pressure chambers, 11 and 22; and the diaphragm 15 is held in a neutral position when the pressure difference between the fluid pressures $P_1$ and $P_2$ balances the predetermined force of a spring 26 located within low pressure chamber 22. Diaphragms 14 and 25, constructed from a seal element having the same actuating area, attach to opposite sides of the diaphragm 15 and therefore have no influence on the balance of diaphragm 15. Each diaphragm acts to close control gates 13 and 24, respectively, when the pressure $P_1$ and $P_2$ becomes unbalanced. Furthermore control gates 13 and 24 are connected to the atmosphere (or the lower stream connection tube) through exhaust outlets 12 and 23, respectively.

Accordingly, the fluid stream flows from an inlet 8 to an outlet 1 through main channels 5 and 17 which are divided by splitter 30. If the amount of the fluid flow should increase in value due to a disturbance at the fluid supply side or the fluid output side, the pressure difference ($\Delta P_0 = P_1 - P_2$) between the front side and the rear side of the orifice formed by butterfly type valve 2 will increase in value. Under this condition diaphragm 15 will be displaced to the right as a result of the unbalance of pressures on both sides of diaphragm 15. Accordingly, at this time, diaphragm 25 will also be displaced to the right with diaphragm 15 to close control gate 24.

When the displacement of diaphragm 15 occurs, as the result of the increase of the fluid flow by a disturbance, the diaphragm 25 isolates an inlet portion 18 of main channel 17 from the atmosphere through a passageway 19 and exhaust outlet 23. The pressure at inlet portion 18 will decrease remarkably, as inlet portion 18 closes, due to the movement of the surrounding fluid stream and the contour of the side walls thereof. As is well known in the art, this decreased pressure causes a flow disturbance; and, accordingly, the path of the fluid stream will be so biased that it is shifted into main channel 17 and only that channel remains open. A restriction valve 4 is provided at the outlet of main channel 17. The fluid stream is restricted by restriction valve 4 so that the pressure difference $\Delta P_0$ of the fluid between the front side and the rear side of the orifice formed by butterfly valve 2 may be decreased to recover the predetermined value of the fluid flow.

On the other hand, when the pressure difference between the front side and the rear side of the orifice formed by butterfly valve 2 decreases due to the decrease of the fluid flow, as the result of the external variation at the fluid supply side or the fluid output side, the balance of the actuating force on each side of diaphragm 15 will be lost and diaphragm 15 will be displaced to the left by means of spring 26 to close control gate 13. The closing of gate 13 isolates an inlet portion 6 of main channel 5 from the atmosphere through a passageway 7 and exhaust outlet 12. Accordingly, the fluid stream will be biased towards main channel 5 contrary to the operation illustrated in the preceding paragraph. Under these conditions, the fluid stream will be free from restriction valve 4. Therefore, the flow will increase so that the presure difference $\Delta P_0$ of the fluid between the front side and the rear side of the orifice formed by butterfly valve 2 may be increased to recover the predetermined value of the fluid flow.

As mentioned above, the regulator provided by the present invention maintains the pressure difference $\Delta P_0$ between the front side and the rear side of the orifice formed by butterfly valve 2 constant. Moreover in accordance with the present invention, it is possible to vary the predetermined value of the fluid flow to any value by modifying the opening degree of the orifice formed by butterfly valve 2.

The embodiment illustrated in FIG. 3 and FIG. 4 is used for regulating the secondary pressure in the outlet 1, in which the secondary pressure to be determined is supplied to a high pressure chamber 11 from a supply inlet 3 through a connection tube 9 and an exhaust outlet 10. A low pressure chamber 22 communicates with the atmosphere through an exhaust outlet 23. Accordingly, when the force expressed by a product of the predetermined pressure in high pressure chamber 11 and the differential actuating area of diaphragms 15 and 14 balances with the predetermined force of a spring 26, diaphragm 15 will be maintained at the neutral position to open control gates 13 and 24. Under the circumstances, exhaust outlets 12 and 23 will communicate with the atmosphere. Accordingly, the air stream supplied from inlet 8 will be exhausted through main channels 5 and 17 into the outlet 1.

If some pressure difference occurs as a result of the increase of the secondary pressure at outlet 1 caused, for example, by disturbances at either the fluid supply side or the fluid output side, the internal pressure of high pressure chamber 11 will increase to unbalance the forces acting on diaphragm 15 and displace the diaphragm, together with a valve plate 25′, to the right to close a control gate 24. Thus, inlet portion 18 will be isolated from the atmosphere. As described hereinabove, inlet portion 18 is surrounded by the air stream moving and the contoured side walls, whereby the pressure in the inlet portion is considerably reduced because no air is supplied thereto. Therefore, the air stream will be biased to flow into main channel 17 only. A restriction valve 4 is provided at the outlet of main channel 17, whereby the fluid stream is restricted by restriction valve 4 so that the air stream may be decreased in pressure to recover the predetermined value of the air stream pressure within inlet 1.

On the other hand, when the secondary pressure at outlet 1 decreases by a disturbance, the internal pressure in pressure chamber 11 also decreases and diaphragm 15 displaces to the left by the action of spring 26 within chamber 22 to close control gate 13. Accordingly, the fluid stream will be biased into only main channel 5 contrary to the case of the operation illustrated in the preceding paragraph. Thus, the fluid stream will be free from the effect of restriction valve 4. Therefore, the secondary pressure at outlet 1 will increase so that the pressure difference between the primary pressure and the secondary pressure may be eliminated to recover the predetermined value thereof. As illustrated above, the regulator provided by the present invention maintains the secondary pressure at outlet 1 constant.

What is claimed is:

1. A regulator for retaining the flow characteristics of a fluid passing therethrough at a predetermined value comprising first and second main channels having inlet portions individually associated therewith a fluid inlet and a fluid outlet connected by said first and second main channels, a restriction provided in said second main channel, pressure sensing means, means connecting said pressure sensing means to said fluid outlet, control gates connected respectively to said inlet portions of said main channels, and means associated with said pressure sensing means for closing respective control gates in response to a change of said flow characteristics at said outlet from said predetermined value, wherein the fluid supplied from said inlet is biased to flow into one of said main channels by closing one of said control gates so as to recover said flow characteristics to said predetermined value in accordance with the existence or nonexistence of said restriction within said main channel.

2. A regulator for retaining the flow characteristics of a fluid passing therethrough at a predetermined value comprising inlet and outlet means, a pair of main channel means joining said inlet and outlet means, restriction means provided in one of said main channel means, chamber means, diaphragm means arranged within said chamber means, means for communicating pressure from said outlet means to at least one side of said diaphragm means, said main channel means having respective inlet portions, a source of reference pressure, passage means connecting said respective inlet portions through said chamber means to said source of reference pressure, and means associated with said diaphragm means for closing said passage means and removing said source of reference pressure from respective inlet portions, whereby said fluid is biased into one of said main channel means for retaining the flow characteristics thereof at a predetermined value.

3. A regulator for retaining the flow characteristics of a fluid passing therethrough at a predetermined value as claimed in claim 2 additionally comprising spring means located on the side of said diaphragm means opposite said side which receives said pressure communicated from said outlet means; said means associated with said diaphragm means including a second diaphragm means connected thereto and separating said source of reference pressure from said pressure communicated from said outlet means, and plate means connected to said diaphragm means and located on the spring side thereof; said passage means operably connected to said chamber means such that movement of said diaphragm means, due to a change of said communicated pressure, displaces said second diaphragm means or said plate means for closing respective passage means; whereby said flow characteristic retained at said predetermined value becomes flow pressure.

4. A regulator for retaining the flow characteristics of a fluid passing therethrough at a predetermined value as claimed in claim 2 additionally comprising means arranged within said outlet means for establishing a pressure differential dependent on flow rate; means for communicating said differential pressures from said outlet means to each side of said diaphragm means; said means associated with said diaphragm means including second and third diaphragm means connected thereto and respectively arranged for separating said source of reference pressure from said differential pressures; said passage means operably connected to said chamber means such that movement of said diaphragm means, due to changes in said differential pressure, displaces said second and third diaphragm means respectively into closing relationship with said passage means; whereby said flow characteristic retained at said predetermined value becomes flow rate.

References Cited

UNITED STATES PATENTS

| | | | |
|---|---|---|---|
| 1,858,689 | 5/1932 | Snoot | 137—503 X |
| 2,597,334 | 12/1951 | Plank | 137—501 X |
| 3,091,393 | 5/1963 | Sparrow | 137—81.5 |
| 3,137,464 | 6/1964 | Horton | 137—81.5 X |
| 3,144,309 | 8/1964 | Sparrow | 137—81.5 X |
| 3,187,763 | 6/1965 | Adams | 137—81.5 |
| 3,239,150 | 3/1966 | Chisel | 137—81.5 X |
| 3,267,949 | 8/1966 | Adams | 137—81.5 |

SAMUEL SCOTT, *Primary Examiner.*